(12) United States Patent
Kobayashi et al.

(10) Patent No.: US 7,597,923 B2
(45) Date of Patent: Oct. 6, 2009

(54) OIL-IN-WATER EMULSIFIED FOOD PRODUCT

(75) Inventors: Hideaki Kobayashi, Tokyo (JP);
 Yukiyoshi Kobayashi, Tokyo (JP);
 Masahiro Goto, Tokyo (JP); Shunsuke Wakami, Tokyo (JP)

(73) Assignee: Q. P. Corporation, Tokyo (JP)

( * ) Notice: Subject to any disclaimer, the term of this patent is extended or adjusted under 35 U.S.C. 154(b) by 679 days.

(21) Appl. No.: 10/559,629

(22) PCT Filed: Oct. 29, 2004

(86) PCT No.: PCT/JP2004/016145
 § 371 (c)(1),
 (2), (4) Date: Dec. 6, 2005

(87) PCT Pub. No.: WO2005/041690
 PCT Pub. Date: May 12, 2005

(65) Prior Publication Data
 US 2006/0222751 A1   Oct. 5, 2006

(30) Foreign Application Priority Data
 Oct. 31, 2003 (JP) ............................. 2003-408182
 Feb. 12, 2004 (JP) ............................. 2004-035691

(51) Int. Cl.
 *A23L 1/32* (2006.01)
 *A23L 1/29* (2006.01)
(52) U.S. Cl. ................. 426/605; 426/613; 426/614
(58) Field of Classification Search ............. 426/605, 426/614
 See application file for complete search history.

(56) References Cited

U.S. PATENT DOCUMENTS

| | | | | |
|---|---|---|---|---|
| 5,780,095 A | * | 7/1998 | Jackeschky | 426/614 |
| 5,948,463 A | * | 9/1999 | Jackeschky | 426/614 |
| 6,113,972 A | | 9/2000 | Corliss et al. | |
| 6,177,120 B1 | * | 1/2001 | Jackeschky | 426/614 |
| 6,635,777 B1 | | 10/2003 | Kawai et al. | |
| 6,660,312 B2 | | 12/2003 | Tobita et al. | |
| 7,041,328 B2 | * | 5/2006 | Kawai et al. | 426/605 |
| 7,160,569 B2 | * | 1/2007 | Kudou et al. | 426/605 |
| 2003/0044507 A1 | | 3/2003 | Tobita et al. | |

FOREIGN PATENT DOCUMENTS

| | | |
|---|---|---|
| EP | 1 185 179 B1 | 2/2004 |
| JP | A-04-149194 | 5/1992 |
| JP | A-2001-000138 | 1/2001 |
| JP | A-2002-171931 | 6/2002 |
| JP | 2003-000190 | 1/2003 |
| JP | A-2003-221332 | 8/2003 |
| WO | WO 00/78162 A2 | 12/2000 |

OTHER PUBLICATIONS

U.S. Appl. No. 10/559,677, filed Dec. 6, 2005, Wakamatsu et al.
English-language translation of the Japanese Office Action.

* cited by examiner

*Primary Examiner*—Carolyn A Paden
(74) *Attorney, Agent, or Firm*—Oliff & Berridge, PLC

(57) ABSTRACT

The present invention provides an oil-in-water emulsified food product containing plant sterol, which has the effect of reducing the level of cholesterol in the blood, and having a smooth texture and excellent emulsification stability. An oil-in-water emulsified food product containing a complex of plant sterol with egg yolk lipoprotein is provided. This oil-in-water emulsified food product can be obtained by a production method having a step wherein a liquid dispersion of a complex is prepared by adding a water-based medium as needed to egg yolk lipoprotein and plant sterol followed by stirring and mixing; a step wherein water-phase ingredient(s) are added as needed, stirred and mixed; and a step wherein oil-phase ingredient(s) are added and an emulsification treatment is performed.

17 Claims, 3 Drawing Sheets

OIL-IN-WATER EMULSIFIED FOOD PRODUCT

TECHNICAL FIELD

The present invention relates to an oil-in-water emulsified food product and manufacturing method thereof, and more particularly to an oil-in-water emulsified food product containing a complex of plant sterol with egg yolk lipoprotein and manufacturing method thereof.

BACKGROUND ART

Plant sterol and plant stanol, which is the saturated form thereof, are known to reduce the total cholesterol concentration and the low-density lipoprotein-cholesterol concentration in blood, and they are considered safe as food products. Because plant sterols are contained in vegetable oil, soy beans, wheat, etc., human beings frequently ingest them, but the amounts ingested are very small, and therefore the expectation of utilizing plant sterols as a food ingredient has increased in recent years.

There are problems, however, because plant sterols are solids at normal temperature (melting point approximately 140° C.) and they are insoluble in water and poorly soluble in oil-based ingredients, that if powdered plant sterols are merely added to various types of food products, the particles of the plant sterol powder coagulate, resulting in a food product with a gritty texture. Therefore, various methods for utilizing plant sterols in food products have been studied.

For example, the following methods have been proposed to obtain an oil-in-water emulsified product such as mayonnaise, etc., that contains plant sterols: a method for obtaining an emulsified product by dissolving the plant sterol in oil to create an oil phase, separately forming a water phase from water and enzyme-treated egg yolk, and then adding the water phase to the oil phase with thorough stirring and mixing (patent document 1); and a method for obtaining an emulsified product by using a complex as an emulsifier, where the complex is prepared by dissolving phospholipid and sterol in an organic solvent, and removing the organic solvent to precipitate the phospholipid and the sterol simultaneously (patent document 2).

Patent document 1: Japanese Patent Application Laid-open No. 2002-171931

Patent document 2: Japanese Patent Application Laid-open No. H4-149194

DISCLOSURE OF THE INVENTION

Problems to be Solved by the Invention

However, there is a problem that in the method of obtaining an oil-in-water emulsion product by dissolving plant sterol initially in oil (patent document 1), the emulsification stability of the oil-in-water emulsified product obtained thereby is poor, and separation easily occurs with long-term storage or the application of physical stimulation.

Moreover, with the method that utilizes a complex of plant sterol with phospholipid (patent document 2), the complex cannot be obtained merely by mixing the plant sterol and phospholipid, and in order to produce that complex, a spray-dry apparatus is used to evaporate the solvent under vacuum because after the plant sterol and phospholipid are dissolved in the organic solvent, the organic solvent must be removed almost instantaneously. In this apparatus, there is a problem that because it is a massive, explosion-proof device, the manufacturing cost of the complex increases. Furthermore, in that complex the phospholipid content is high in comparison with the plant sterol content. As a result, whenever an attempt is made to increase the plant sterol content in the oil-in-water food product, the phospholipid content becomes too high, and the unpleasant taste of the phospholipid adversely affects the flavor of the oil-in-water food product.

In contrast, an object of the present invention is to provide an oil-in-water emulsified food product that has excellent emulsification stability even with a high plant sterol content and that provides a smooth texture in the mouth without the grittiness originating from the plant sterol.

Means for Solving the Problems

The inventors obtained the following findings:

(i) When egg yolk and powdered plant sterol are stirred and mixed in a water-based medium, they disperse uniformly;

(ii) In such a case, if the dilution rate of the egg yolk at the time of stirring and mixing is high, the plant sterol having been floating on the surface of the water before stirring and mixing will precipitate when the emulsion is let stand after stirring and mixing;

(iii) This precipitate is believed to be a complex of plant sterol with egg yolk lipoprotein because it does not coagulate, it provides a smooth texture without grittiness, after separation and drying thereof its dispersibility is markedly improved over the original plant sterol when it is re-dispersed in a water-based medium, and the egg yolk lipoprotein that was present initially in the egg yolk has disappeared from the supernatant produced by precipitation in the stirred and mixed solution; and (iv) When this complex of plant sterol with egg yolk lipoprotein is allowed to be contained in an oil-in-water emulsified food product, the oil-in-water emulsified food product has long-term storage stability even if the content of the complex is considerably high, the water phase and the oil phase do not separate after physical stimulation, and the food product has a smooth texture.

In other words, the present invention provides:

(1) an oil-in-water emulsified food product containing a complex of plant sterol with egg yolk lipoprotein, and more particularly, in said oil-in-water emulsified food product;

(2) an embodiment wherein the egg yolk lipoprotein forming the complex is a lipoprotein comprising phospholipase A (hereinafter referred to as PLA) modified egg yolk, decholesterolized egg yolk, or PLA modified decholesterol egg yolk;

(3) an embodiment wherein the composition ratio of plant sterol and egg yolk lipoprotein in the complex is 232 or less parts by mass of plant sterol with respect to 1 part by mass of egg yolk lipoprotein;

(4) an embodiment wherein the oil-in-water emulsified food product contains lyso-phospholipid; and (5) an embodiment wherein the lyso-phospholipid content is 0.3 wt % or greater.

In addition, the present invention provides as a method for producing the above oil-in-water emulsified food product:

(6) a process having a step wherein at least egg yolk lipoprotein and plant sterol are stirred and mixed to prepare a liquid dispersion of a complex thereof, and a step wherein an oil-phase material is added to the liquid dispersion of the complex, and more particularly, in the method for producing the oil-in-water emulsified food product;

(7) an embodiment wherein a water-based medium and/or lyso-phospholipid are added in the step wherein the liquid dispersion of the complex is prepared;

(8) an embodiment wherein the method has further a step wherein lyso-phospholipid and/or water phase ingredient(s) are added after preparation of the liquid dispersion of the complex;

(9) an embodiment wherein the liquid dispersion of the complex is prepared using 232 or less parts by mass of plant sterol with respect to 1 part by mass of egg yolk lipoprotein;

(10) an embodiment wherein egg yolk liquid is used as the egg yolk lipoprotein;

(11) an embodiment wherein a dilute egg yolk liquid is used as the egg yolk lipoprotein;

(12) an embodiment wherein 185 or less parts by mass of plant sterol is used with respect to 1 part by mass of egg yolk solid; and

(13) an embodiment wherein the mean particle size of the plant sterol is 50 µm or less.

EFFECT OF THE INVENTION

Problems such as a gritty texture and oil phase separation that generally occurs when plant sterol is contained in an oil-in-water emulsified food product do not easily occur in the oil-in-water emulsified food product of the present invention because the plant sterol is included as a complex with egg yolk lipoprotein. More specifically, it is inferred that because the plant sterol particles that are dispersed in the oil-in-water emulsified food product are surrounded by the egg yolk lipoprotein, it is difficult for the plant sterol particles to coagulate together, and therefore an oil-in-water emulsified food product with a smooth texture on the tongue and high emulsification stability is obtained.

This effect is markedly enhanced when modified egg yolk such as PLA modified egg yolk, PLA modified decholesterolized egg yolk, etc., is used for the egg yolk lipoprotein of the complex.

In addition, when modified egg yolk such as decholesterolized egg yolk, PLA modified decholesterolized egg yolk, etc., is used for the egg yolk lipoprotein of the complex, the cholesterol contained in the egg yolk lipoprotein is removed, and therefore the oil-in-water emulsified food product of the present invention that uses the above complex suits the original purpose for ingesting plant sterol, i.e., to reduce the levels of total cholesterol and low density lipoprotein cholesterol in the blood, even better.

Furthermore, the oil-in-water emulsified food product of the present invention can be mass-produced in accordance with the method for producing an oil-in-water emulsified food product of the present invention.

BEST MODE FOR CARRYING OUT THE INVENTION

Figure 1:
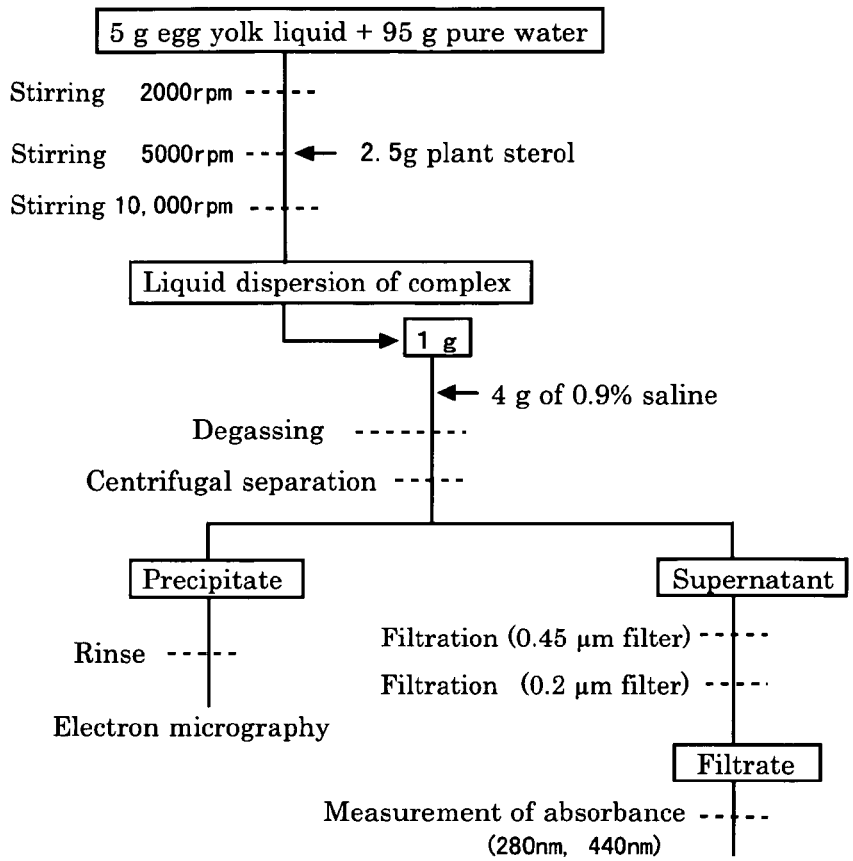
FIG. 1 is a flow sheet demonstrating the method for preparing the complex of plant sterol with egg yolk lipoprotein.

The present invention is explained in detail below. Unless otherwise noted, the symbol "%" refers to "wt %".

In the present invention the term of "egg yolk" refers to various forms of egg yolk that are not diluted such as egg yolk liquid separated from the egg white after a egg is broken, dried egg yolk, frozen egg yolk, heat sterilized egg yolk, etc. Furthermore, the term of "egg yolk" includes modified egg yolk wherein various treatments have been performed such as lyso-conversion (treatment by phospholipase A), decholesterolization, lyso-decholesterolization, etc.

The term of "egg yolk liquid" refers to an undiluted egg yolk liquid such as egg yolk separated from the egg white after a shell egg is broken, heat sterilized egg yolk, frozen egg yolk that has been thawed, rehydrated egg yolk that is obtained by adding water to dried powdered egg yolk to the extent of normal egg yolk, and egg yolk subjected to various treatments such as lyso-conversion, decholesterolization, lyso-decholesterolization, etc.

The term of "dilute egg yolk liquid" refers to a dilution of the above egg yolk in a water-based medium such as pure water, liquid egg white, or seasoning (for example, soy sauce or broths).

The term of "egg yolk lipoprotein" refers to a complex comprising proteins, phospholipids that contain both hydrophilic and hydrophobic regions, neutral lipids such as triacylglycerol, cholesterol, etc. This complex has a structure wherein the hydrophilic regions of the proteins and lipoproteins are directed outward, the hydrophilic regions are directed inward, and the neutral lipids are enclosed therein. This egg yolk lipoprotein accounts for approximately 80% of the egg yolk solid that forms the main constituent of egg yolk. Since egg yolk solid accounts for approximately 50% of the egg yolk liquid that has been separated from the egg white after a shell egg is broken (or, when a shell egg is broken industrially, approximately 45% due to egg white contamination), the egg yolk lipoprotein comprises 36% to 40% of the egg yolk liquid.

The egg yolk lipoprotein contained in PLA modified egg yolk is one wherein part or all of the phospholipid constituting the aforementioned egg yolk lipoprotein has been hydrolyzed to form lyso-phospholipid. In the complex of the present invention, it is preferable to use egg yolk lipoprotein contained in PLA modified egg yolk because the dispersibility of plant sterol is markedly increased thereby.

PLA modified egg yolk is obtained by treating egg yolk liquid, which is obtained from raw egg yolk or dried egg yolk powder that has been rehydrated with water, etc., with enzymes to lyso-convert the lipoproteins contained therein. The enzyme used in this treatment is generally phospholipase A (for example, phospholipase $A_1$, phospholipase $A_2$). When the egg yolk is treated with phospholipase A, the phospholipase A acts on the phospholipids constituting the egg yolk lipoprotein, which is the main component of egg yolk, whereby lyso-phospholipid can be obtained wherein the fatty acid residue at position 1 or position 2 of the phospholipids of egg yolk lipoprotein has been hydrolyzed.

For the enzyme treatment conditions, when phospholipase A is used, for example, the reaction is carried out for 2 to 12 hours at 45 to 55° C. and pH 6 to 8 using $10^2$ to $10^4$ units of enzyme activity per 1 kg of egg yolk liquid. Moreover, the lysis ratio (the weight ratio of lyso-phosphatidyl choline to the combined weight of lyso-phosphatidyl choline and phosphatidyl choline after the enzyme treatment) preferred in the present invention is 10% or more, preferably 30% or more when analyzed by an Iatroscan technique (a TLC-FID procedure). If the lysis ratio exceeds 90%, however, the taste tends to be bitter.

On the other hand, the term of "decholesterolized egg yolk" refers to modified egg yolk wherein the cholesterol present in the egg yolk has been reduced or removed. The cholesterol content of raw egg yolk is approximately 1.2%. In the complex of the present invention, it is preferable to use decholesterolized egg yolk because the dispersibility of the plant sterol can be increased and the ingestion of cholesterol accompanying the ingestion of the complex can be decreased.

With respect to the egg yolk decholesterolization treatment, a method using supercritical carbon dioxide is preferred because it is efficient, and preliminary drying of the egg yolk liquid to be decholesterolized enables the decholesterolization treatment to be carried out even more efficiently. In such a case, the present invention places no particular restriction on the means of drying, and with processes such as spray drying, freeze drying, etc., for example, the water content of desugared egg yolk may preferably adjusted to about 1% to 6%. Thus, the cholesterol in the egg yolk is also concentrated by this drying process, and the cholesterol content becomes 2% to 3%.

It is preferable for the egg yolk liquid to be decholesterolized to undergo a desugaring treatment in advance, whereby the decholesterolized dried egg yolk is unlikely to turn brown and it will maintain its bright color. There are some processes utilizing bacteria, yeast, enzymes, etc., for desugaring and, for example, when a yeast is used: about 0.2% yeast is added to the egg yolk liquid, desugaring is performed by placing the liquid in a thermostatic chamber at 30° C. for 3 hours with stirring, after the temperature reaches 60° C. fermentation is stopped by maintaining that temperature for 3 minutes, and then the liquid is cooled to obtain desugared egg yolk liquid. Raw egg yolk liquid contains approximately 0.2% free glucose, but the concentration of free glucose therein can be reduced to 0.02% to 0.1% by this desugaring treatment.

Next, in the decholesterolization treatment using supercritical carbon dioxide, the egg yolk is treated with carbon dioxide at the critical temperature of 31.0° C. or higher and the critical pressure of 7.14 MPa or higher, and more specifically, with supercritical carbon dioxide at a temperature of 35 to 45° C. and a pressure of 13 to 50 MPa. The decholesterolization process itself using supercritical carbon dioxide can be performed according to prior art methods. The cholesterol content of decholesterolized dried egg yolk after this treatment, for example, becomes about 0.1% to 1.0% thereby.

A method, in which egg yolk is mixed with edible oil, the edible oil is then separated from the mixture and this mixing and separating procedure is performed one to several times, can serve as an alternative method for removing cholesterol from egg yolk.

A method for measuring cholesterol in the present invention was performed in accordance with "Cholesterol Quantitative Method A" of the "Japanese Standard Tables of Food Composition Analysis Manual" published by The Resources Council Food Composition Subcommittee of the Science and Technology Agency of Japan (January 1997).

The term of "PLA modified decholesterolized egg yolk" refers to the aforementioned PLA modified egg yolk that has been decholesterolized by supercritical carbon dioxide, etc. It is preferable to make the cholesterol content of the modified dried egg yolk about 0.1% to 1.0% after the decholesterolization treatment with supercritical carbon dioxide is performed in the same manner as described above.

On the other hand, plant sterol has a similar structure to cholesterol, it comprises several percent of the lipid-soluble fraction of plants, it has a melting point of about 140° C., and it is a solid at normal temperatures. The present invention does not particularly restrict the type of plant sterol used in the present invention, and examples include β-sitosterol, stigmasterol, campesterol, brassicasterol, etc. Furthermore, plant stanol, which is the saturated form of a plant sterol, can also be used, where as the plant stanol, there can be used not only natural plant stanol but also plant stanol obtained by hydrogenating plant sterol.

In the present invention, plant sterol contains the so-called free form of plant sterol as the primary component, but it may contain a slight amount of the esterified form thereof, etc.

Flakes or powdered forms of plant sterol that are commercially available can be used in the present invention, and it is preferable to use a powder with an average particle size of 50 μm or less, particularly 10 μm or less. When flakes or powder with an average particle size greater than 50 μm are used, it is preferable when producing the complex by stirring and mixing with egg yolk that the stirring and mixing is performed while reducing the average particle size using a homogenizer (T. K. Mycolloider®: Tokushu Kika Kogyo Co., Ltd.; Comitrol®: Urschel Laboratories, Inc.), whereby the complex of plant sterol with egg yolk lipoprotein will be formed more easily, dispersibility will be increased, and the texture will become smoother thereby.

As a method of measuring the average particle size of the plant sterol, there is a method in which the plant sterol is mixed with pure water at 20° C., measurement is performed with a laser diffraction particle size analyzer (Shimadzu Corporation, SALD-200VER), and a mathematical conversion for volume is performed.

The complex of plant sterol with egg yolk lipoprotein can be obtained by stirring and mixing of the aforementioned plant sterol and egg yolk lipoprotein, preferably in a water-based medium. It is assumed that in this complex the hydrophilic region of the amphiphilic egg yolk lipoprotein is directed outward (toward the aqueous side) and coats the plant sterol, the surface of the complex becomes hydrophilic thereby, and as a result, the complex can be dispersed in water, mutual coagulation of the complex does not occur, the complex is stably dispersed in the water phase, and because mutual coagulation does not occur, the texture is unlikely to become gritty when the complex is contained in an oil-in-water emulsified food product.

In the past phospholipid has been used to obtain a plant sterol emulsified product (see patent document 2), and phospholipid is contained in egg yolk (egg yolk phospholipid). However, because the phospholipid in egg yolk is present in the form of egg yolk lipoprotein bound to protein, the phospholipid that forms the complex in egg yolk and the phospholipid described in patent document 2 have an entirely different effect on plant sterol. More specifically, whereas egg yolk lipoprotein forms a complex merely by stirring and mixing with plant sterol in a water-based medium, it can be inferred that phospholipid alone will not form a complex as egg yolk lipoprotein does merely by stirring and mixing with plant sterol (see Example 5).

As an embodiment of stirring and mixing plant sterol and egg yolk lipoprotein in the present invention, it is preferable to use, as the egg yolk, a dilute egg yolk liquid prepared by suitably diluting the egg yolk lipoprotein with a water-based medium. In such a case, when performing stirring and mixing with the plant sterol, the egg yolk liquid obtained by breaking shell eggs and separating the yolk from the egg white is not necessary to be diluted with a water-based medium, while dried egg yolk should be rehydrated for use with a water-based medium can used instead. Thus, stirring of the plant sterol and the egg yolk lipoprotein becomes easier and formation of the complex of plant sterol with egg yolk lipoprotein becomes easier thereby, which is preferably. In this situation, if the ratio of water-based medium is too low, the ratio of plant sterol will be relatively increased, and stirring will be requested for a long time because the dilute egg yolk liquid will become more viscous, which is undesirable; conversely, if the ratio of the water-based medium is too high, the ratio of egg yolk lipoprotein in the complex will become exceedingly small, and the dispersibility of the complex in the water-based medium will be decreased, which is also undesirable.

In addition to pure water, for example, liquid egg white, seasonings (for example, soy sauce and broths), etc., can serve as the water-based medium used in the preparation of the dilute egg yolk liquid. Moreover, a small amount of edible oil such as salad oil, etc., and alcohol can be added to the water-based medium.

In forming the complex of plant sterol with egg yolk lipoprotein by stirring and mixing of egg yolk and plant sterol in a water-based medium, the dispersibility of the complex in the water-based medium can be increased by using a small amount of egg yolk with respect to the plant sterol. For example, to disperse 100 parts by mass of plant sterol in water, 0.54 or more parts by mass of egg yolk solid will be sufficient; in other words, 185 or less parts by mass plant sterol to 1 part by mass egg yolk solid will be sufficient (see Example 2). Moreover, because approximately 80% of egg yolk lipoprotein is present in egg yolk solids, a complex of 232 or less parts by mass of plant sterol with respect to 1 part by mass egg yolk lipoprotein can be obtained by stirring and mixing of plant sterol and egg yolk in the above ratio.

A representative method for producing the complex of plant sterol with egg yolk lipoprotein goes as follows.

First, hen's shell eggs are broken and the egg white is removed to obtain egg yolk liquid. Next, the egg yolk liquid is stirred and mixed with a water-based medium such as pure water, etc., to dilute the egg yolk liquid. It is possible to prepare a complex of plant sterol with egg yolk lipoprotein without diluting the egg yolk liquid, but if the water content is too low, the viscosity will increase as the amount of added plant sterol increases, and a considerable amount of time and energy will be required for the stirring; therefore, when it is necessary to increase the proportion of plant sterol with respect to 1 part by mass of egg yolk lipoprotein, it is desirable to dilute the egg yolk liquid suitably with a water-based medium such as pure water to prepare a dilute egg yolk liquid.

Next, the dilute egg yolk liquid and the plant sterol are stirred and mixed until they are uniform overall using a homogenizer such as T. K. Homomixer®, colloid mill, high pressure homogenizer, T. K. Mycolloider® (Tokushu Kika Kogyo Co., Ltd.), etc., (for example, 10,000 rpm for 5 to 20 minutes) to prepare a complex of plant sterol with egg yolk lipoprotein. The temperature during the stirring and mixing may be normal temperature (20° C.), but it is preferable to heat the mixture to 45 to 55° C.

The complex obtained thereby can be used in the form of a liquid dispersion in the oil-in-water emulsified food product of the present invention, or for long-term storage the complex may be used as a dried powder obtained by freeze drying, spray drying, etc.

The oil-in-water emulsified food product of the present invention is an emulsified product wherein water phase ingredients and oil phase ingredients are emulsified into an oil-in-water emulsion. More specifically, it is an emulsified product wherein oil droplets are dispersed in the water phase, and concrete examples include mayonnaise, low-calorie mayonnaise-like emulsified food product, tarter sauce, emulsified types of dressings, etc. The ratio of water phase and oil phase may range from about 90% to 10% of the latter to 10% to 90% of the former, but generally, it will be about 80% to 30% of the latter to 20% to 70% of the former.

In the oil-in-water emulsified food product of the present invention, the aforementioned complex of plant sterol with egg yolk lipoprotein is contained mainly in the water phase. The content of the complex in the oil-in-water emulsified food product will depend on the amount of plant sterol contained in the oil-in-water emulsified food product, but generally the necessary amount of ingested plant sterol to lower blood cholesterol in humans is said to be 0.4 g or more, preferably 0.7 g or more, and because the amount of mayonnaise that a Japanese person consumes at a single meal is approximately 15 g, in the oil-in-water emulsified food product of the present invention, it is preferable for that 15 g to contain 0.4 g or more, preferably 0.7 g or more of plant sterol; that is, it is preferable for the 15 g to contain an amount of complex that will provide 2.7% or more, preferably 4.7% or more of plant sterol content.

As stated above, with the oil-in-water emulsified food product of the present invention, past problems such as a gritty texture and separation of the oil phase that were caused by including plant sterol in an oil-in-water emulsified food product are unlikely to occur even when the emulsified food product contains enough the complex to provide the aforementioned amount of plant sterol because the plant sterol is in the form of a complex with egg yolk lipoprotein. In other words, it can be inferred that because the plant sterol particles are dispersed in the oil-in-water emulsified food product in a form wherein they are surrounded by egg yolk lipoprotein, the plant sterol particles do not coagulate together easily and, as a result, an oil-in-water emulsified food product is obtained that has a smooth texture and high emulsification stability.

In addition, it is preferable for the oil-in-water emulsified food product of the present invention contain to lyso-phospholipid, because the emulsification stability will be increased even more.

In this context, the term of "lyso-phospholipid" refers to a so-called PLA modified phospholipid wherein a phospholipid has been hydrolyzed by the enzyme phospholipase A1 or phospholipase A2 and deacylated by removal of the acyl group at position 1 or position 2. Herein, phospholipids are distinguished from lipoproteins wherein a lipid is bonded to a protein, and therefore PLA modified lipoproteins are excluded from the term of "lyso-phospholipid".

In the present invention lyso-phospholipid itself may be used, but it is also possible to use substances generally called egg yolk lyso-lecithin, soy lyso-lecithin, enzyme-treated egg yolk lecithin, enzyme-treated soy lecithin, enzyme-treated egg yolk oil, etc., that also contain other lipid constituents such as triglyceride, cholesterol, phospholipid, etc. In such an instance, the portion of lyso-phospholipid contained in these lipid mixtures corresponds to the term lyso-phospholipid used in the present invention.

The oil-in-water emulsified food product of the present invention that contains lyso-phospholipid does not easily undergo the oil phase separation phenomenon wherein the oils and fats seep out onto the surface of the oil-in-water emulsified food product. Because lyso-phospholipids have strong emulsification power and good affinity to egg yolk lipoprotein, it can be inferred that they contribute to the improvement in dispersibility of the complex of plant sterol with egg yolk lipoprotein in the water phase.

It is preferable that the content of lyso-phospholipid in the oil-in-water emulsified food product of the present invention is 0.3% or more.

Various ingredients used in the oil-in-water emulsified food product of the present invention other than the aforementioned complex and lyso-phospholipid can be selected as needed in response to the type of oil-in-water emulsified product desired. For example, in the case of a mayonnaise-like emulsified food product, water phase ingredients may include hydrophilic edible vinegars such as rice vinegar, grain vinegar, apple vinegar, etc., egg yolk, egg white, various broths, seasonings such as soy sauce, salt, sugar, etc., and flavor enhancers such as monosodium glutamate, etc.; the oil phase ingredients may include lipophilic animal and vegetable oils and fats such as canola oil, corn oil, cottonseed oil, olive oil, safflower oil, palm oil, egg yolk oil, fish oil, etc., and chemically treated oils and fats such as MCT, diglyceride, etc. In addition, if it is a low-calorie mayonnaise-like food product wherein the content of edible oils and fat is reduced, soy protein, starch, dextrin, cellulose, and other polysaccharide thickeners may be included.

Next, the method for producing the oil-in-water emulsified food product of the present invention will be explained.

First, a liquid dispersion of the complex obtained by stirring and mixing of the aforementioned egg yolk liquid or dilute egg yolk liquid with plant sterol is prepared.

Lyso-phospholipid can be added during the process step of preparing the liquid dispersion of this complex. In such a case, the lyso-phospholipid is added to the egg yolk liquid and plant sterol, water-based medium is added as needed, and stirring and mixing are performed; however, if the amount of lyso-phospholipid to be added is relatively large, first the water-based medium is added to the egg yolk liquid and plant sterol as needed, stirring and mixing are performed, and then the lyso-phospholipid is added followed by more stirring and mixing.

When preparing the liquid dispersion of the complex, edible oils such as salad oil, etc., and alcohol, etc., may also be added provided the amount is small.

As the method for producing the oil-in-water emulsified food product in the present invention, the aforementioned step wherein the liquid dispersion of complex is prepared may be established separately, but it is preferable, when preparing the water phase of the oil-in-water emulsified food product, that the liquid dispersion of complex is performed during the first part of the step for producing the water phase so as to add plant sterol and water-based medium as needed to the egg yolk as water phase ingredients in advance, form the complex by stirring and mixing, add other water phase ingredients and lyso-phospholipid thereto as needed, and then perform stirring and mixing, because the efficiency is greater.

For example, it is possible to prepare the water phase containing the complex efficiently by: adding plant sterol to egg yolk liquid (which is a water phase ingredient); adding the water-based medium, egg white liquid, pure water, etc., (which are the other water phase ingredients); performing stirring and mixing using the aforementioned homogenizer, etc., until the mixture is uniform throughout to prepare the liquid dispersion of complex; then adding other water phase ingredients such as vinegar, salt, etc., and lyso-phospholipid; and performing further stirring and mixing.

Hydrophobic ingredients such as edible oils and fats, etc., may also be added to the water phase provided the amount is small. Therefore, it is possible, for example, to adopt a method wherein a powdered ingredient is preliminarily mixed in salad oil, etc., to enable uniform dispersion of the powdered ingredient in the water phase ingredients.

Next, the oil-in-water emulsified food product of the present invention is produced by adding the oil phase ingredients to the water phase obtained thereby, and performing emulsification. In this case the emulsification may be performed by conventional methods, and it is preferable to use a homogenizer such as T. K. Homomixer®, colloid mill, high pressure, homogenizer, T. K. Mycolloider® (Tokushu Kika Kogyo Co., Ltd.), etc., to prepare a high quality oil-in-water emulsified food product with fine oil droplets.

In addition, the oil phase in the oil-in-water emulsified food product of the present invention mainly contains edible oil and fat, but lipophobic ingredients may also be contained provided the amount is small.

When the oil-in-water emulsified food product is a mayonnaise-like emulsified food product, it is possible to add a step wherein vinegar, etc., which is a water phase ingredient, is added and homogenized after the emulsification of the water phase and the oil phase to prevent the protein ingredients from being denatured by acidic substances such as vinegar, etc.

EXAMPLES

The present invention is explained concretely below through examples.

Example 1

Analysis of Constituent Ingredients of the Complex (1) A complex of plant sterol with egg yolk lipoprotein was prepared from plant sterol and egg yolk as shown below based on the flow sheet of FIG. 1.

First, 95 g of pure water was added to 5 g of egg yolk liquid (2.5 g of egg yolk solids, approximately 2 g of egg yolk lipoprotein in the egg yolk solids), and stirring was performed for 1 minute at 2000 rpm using a homogenizer (Hiscotron, Niti-on Co., Ltd.) to prepare a dilute egg yolk liquid. Next 2.5 g of plant sterol (free form 97.8%, esters 2.2%, mean particle size approximately 3 μm) was added while stirring at 5000 rpm; stirring was then performed at 10,000 rpm for 5 minutes; and a liquid dispersion of complex comprising plant sterol and egg yolk lipoprotein was obtained.

To 1 g of the liquid dispersion obtained thereby was added 4 g of 0.9% saline solution; degassing for 1 minute at a vacuum of 10 mmHg was performed with a vacuum dryer (model VOS-450D, Tokyo Rikakikai Co., Ltd.); and centrifugal separation was performed for 15 minutes at 3000 rpm with a centrifuge (model H-108ND, Kokusan Corporation) to obtain a precipitate and supernatant. The supernatant was filtered with a 0.45 μm filter; and then filtered again with a 0.2 μm filter to remove a complex and the plant sterol that was not formed into a complex.

The absorbance (O.D.) was measured at 280 nm (absorption wavelength of amino acids having an aromatic ring in proteins) using a spectrophotometer (model U-2010, Hitachi, Ltd.) using 0.9% saline solution as a control, and the amount of protein in the filtrate was measured (Example 1-1).

The amount of plant sterol added was varied as shown in Table 1, and the absorbances were measured in the same manner (Examples 1-2 to Example 1-8).

Figure 2:
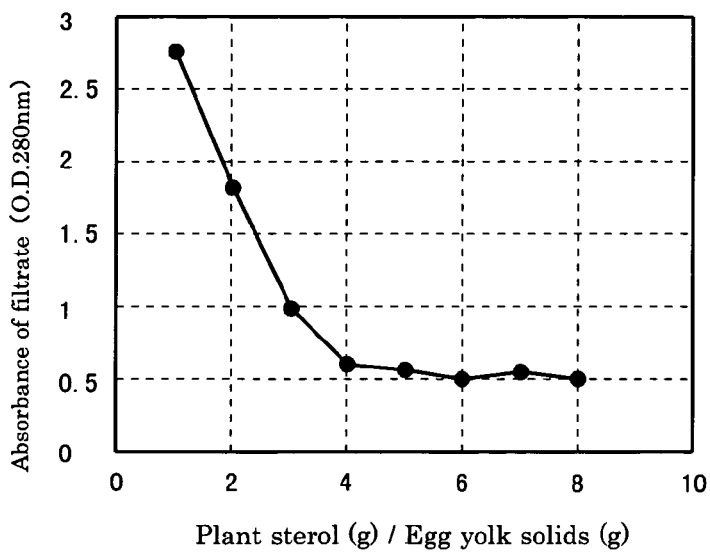
FIG. 2 is a graph showing the relationship between the ratio of plant sterol to egg yolk solid and the absorbance of the supernatant of a liquid dispersion of the complex when a complex is formed from plant sterol and egg yolk.

The results are shown in Table 1 and FIG. 2.

TABLE 1

| | Amount of plant sterol added (g) | Plant sterol/ egg yolk solids (weight ratio) | Plant sterol/ egg yolk lipoprotein (weight ratio) | Absorbance of filtrate (280 nm) |
|---|---|---|---|---|
| Example 1-1 | 2.5 | 1 | 1.3 | 2.770 |
| Example 1-2 | 5.0 | 2 | 2.5 | 1.842 |

TABLE 1-continued

| | Amount of plant sterol added (g) | Plant sterol/ egg yolk solids (weight ratio) | Plant sterol/ egg yolk lipoprotein (weight ratio) | Absorbance of filtrate (280 nm) |
|---|---|---|---|---|
| Example 1-3 | 7.5 | 3 | 3.8 | 1.002 |
| Example 1-4 | 10.0 | 4 | 5.0 | 0.626 |
| Example 1-5 | 12.5 | 5 | 6.3 | 0.590 |
| Example 1-6 | 15.0 | 6 | 7.5 | 0.548 |
| Example 1-7 | 17.5 | 7 | 8.8 | 0.577 |
| Example 1-8 | 20.0 | 8 | 10.0 | 0.536 |

From Table 1 and FIG. 2 it is clear that when the amount of sterol was 4 g or less with respect to 1 g of egg yolk solids, the absorbance of the filtrate decreased as the ratio of plant sterol to egg yolk solid increased. Therefore, it can be inferred that the protein contained in the egg yolk became bound to the plant sterol due to the addition of plant sterol to the dilute egg yolk liquid, and the protein concentration in the filtrate decreased. On the other hand, it is clear that when the amount of plant sterol was 4 g or more with respect to 1 g of egg yolk solids, protein not bound to the plant sterol in the filtrate was present in the filtrate because the absorbance of the filtrate became constant.

In addition, when the amount of plant sterol was 4 g or less with respect to 1 g of egg yolk solids, protein bound to the plant sterol was left over in the filtrate, and therefore it is clear that 4 g or more of plant sterol (5 g or more of plant sterol to 1 g of egg yolk lipoprotein) is needed to use 1 g of egg yolk solids to form the complex without leftover starting materials.

(2) In addition to the above measurement at 280 nm, absorbance was measured at 440 nm to detect the protein present in the filtrates of Example 1-1 and Example 1-6 obtained in (1), and the ratio of absorbance at 440 nm and 280 nm was calculated. In this case, 440 nm is the absorption wavelength for the oil-soluble pigment (carotene) contained in the lipoprotein. The results are shown in Table 2.

TABLE 2

| | Amount of plant sterol added (g) | Plant sterol/egg yolk solids (weight ratio) | Plant sterol/egg yolk lipoprotein (weight ratio) | Absorbance of filtrate | | Absorbance ratio (440 nm/ 280 nm) |
|---|---|---|---|---|---|---|
| | | | | 280 nm | 440 nm | |
| Example 1-1 | 2.5 | 1 | 1.3 | 2.770 | 1.208 | 0.44 |
| Example 1-6 | 15.0 | 6 | 7.5 | 0.548 | 0.100 | 0.18 |

From Table 2 it is clear that when a proper amount of egg yolk with respect to plant sterol is bound as in Example 1-6, almost no egg yolk lipoprotein remains in the filtrate because the absorbance at 440 nm is extremely low. Therefore, it is clear that the egg yolk lipoprotein forms a complex with the plant sterol.

Furthermore, when the amount of egg yolk with respect to plant sterol is excessive as in Example 1-1, the absorbance at both 280 nm and 440 nm is high, and because the ratio of absorbance between 440 nm and 280 nm is higher than in Example 1-6, it is clear that both egg yolk lipoprotein that was able to form a complex and protein that was not able to form a complex are present in the filtrate, and that more egg yolk lipoprotein is left over than in Example 1-6.

(3) An investigation to identify the respective proteins that do and do not form a complex with the plant sterol was conducted by performing SDS-PAGE (poly acrylamide gel electrophoresis) on the filtrates of Example 1-1 and Example 1-6 obtained in (1).

In this case, as the measurement conditions for electrophoresis a portion of the filtrate was freeze dried, and dissolved in sample buffer, a fixed amount thereof was placed on a 4% to 20% concentration gradient gel, a constant current of 20 mA was applied, and the protein was stained with Coomassie blue. (sample buffer composition: 5.0 mL of distilled water, 1.25 mL of 0.5 M tris-hydrochloride buffer, 1.0 mL of glycerol, 2.0 mL of 10% SDS, 0.5 mL of 2-mercaptoethanol, and 0.05 mL of 0.05% bromophenol blue)

Figure 3:
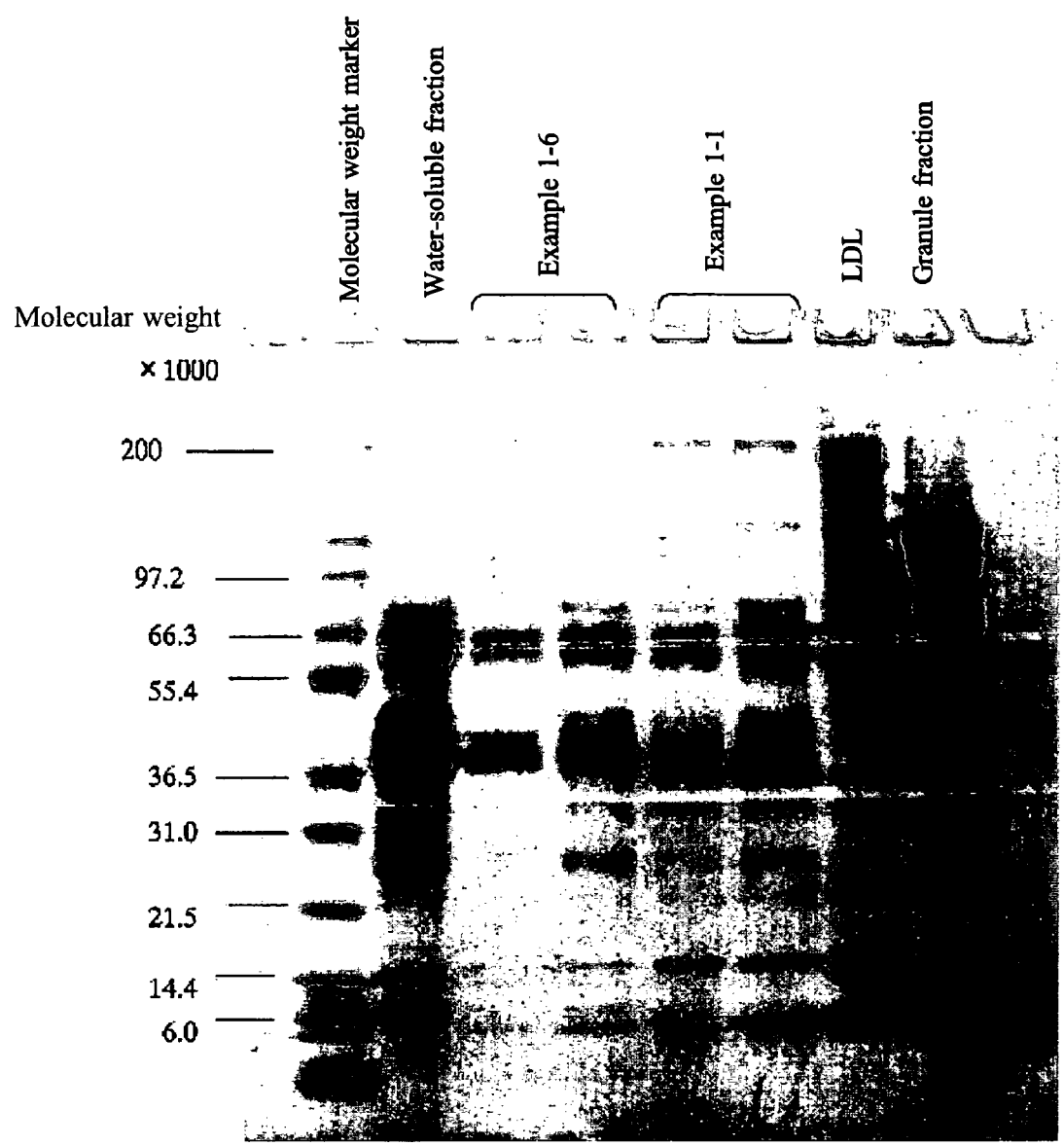
FIG. 3 is an electrophoresis pattern of the filtrate of the liquid dispersion of complex obtained by stirring and mixing of plant sterol and egg yolk.

FIG. 3 shows the electrophoresis pattern.

In the electrophoresis pattern of Example 1-1 wherein the ratio of egg yolk to plant sterol was excessive, both a protein peculiar to the water-soluble fraction (molecular weight of 36.5×1000 in FIG. 3) and a protein peculiar to egg yolk lipoprotein (molecular weight 200×1000 in FIG. 3) were detected but when the ratio of egg yolk to plant sterol was not excessive as in Example 1-6, the protein specific to egg yolk lipoprotein was not detected, and only the protein specific to the water-soluble fraction was detected. As a result, it is clear that in egg yolk the protein not forming a complex is a protein peculiar to the water-soluble fraction and the protein forming the complex is egg yolk lipoprotein.

Figure 4:
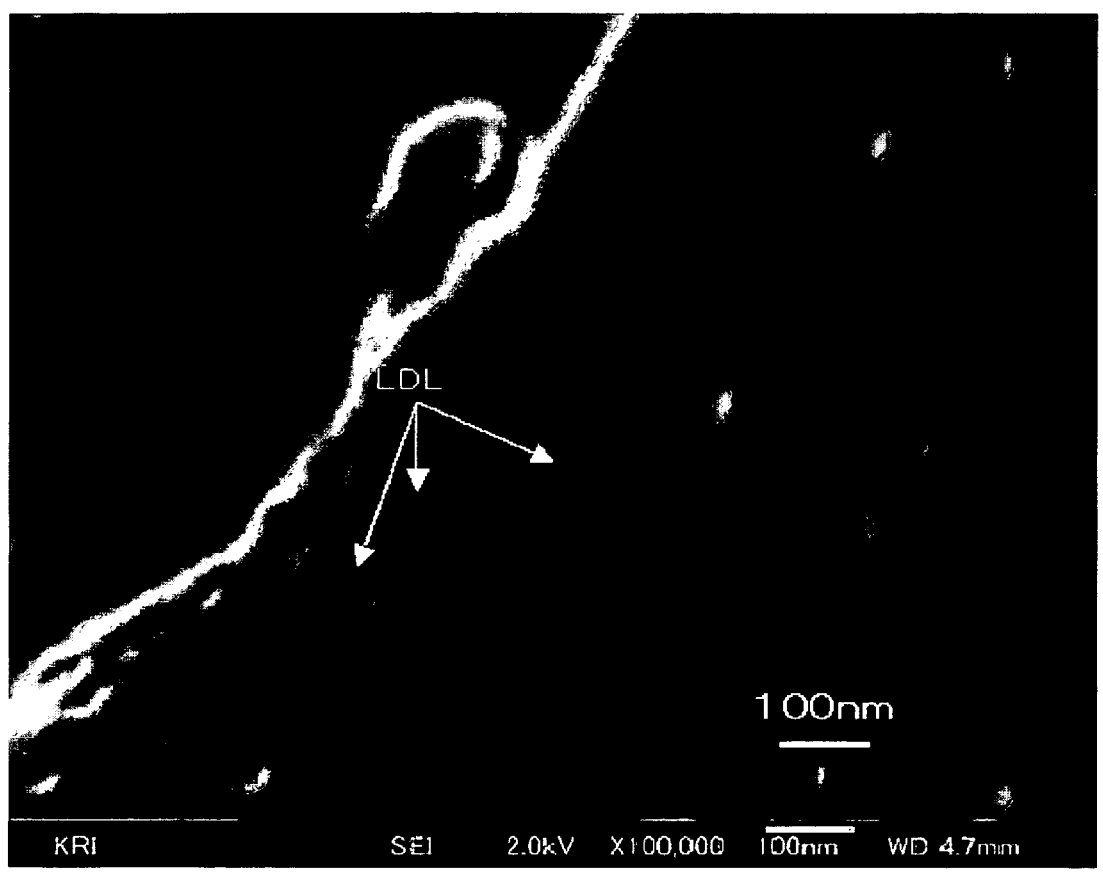
FIG. 4 is an electron micrograph of the complex.

(4) The remaining precipitate that had separated from the supernatant in Example 1-4 was rinsed with approximately a 60-fold amount by mass of physiological saline; centrifugal separation was performed again to obtain a precipitate; a complex powder was obtained by freeze drying the precipitate; the powder was scattered on an electroconductive tape; carbon deposition was performed to render the powder conductive; and a photograph was taken with a field emission scanning electron microscope (model JSM-7400F, JEOL, Ltd.) (acceleration voltage 5 kv, magnification 100,000 times). FIG. 4 shows this photograph. From this photograph it is clear that lipoprotein (LDL) coats the surface of the plant sterol.

Example 2

Study of Ratio of Plant Sterol and Egg Yolk Lipoprotein, etc., at Time of Preparation of the Liquid Dispersion of Complex The amount of pure water, the amount of egg yolk liquid (45% solids) obtained by the industrial breaking of hen's shell eggs, and the amount of plant sterol were varied as shown in Table 3; liquid dispersions of the complex of plant sterol with egg yolk lipoprotein were prepared in accordance thereto; and the preferred water content and ratio of plant sterol to egg yolk in the preparation of the complex of plant sterol with egg yolk lipoprotein were studied by investigating the dispersibility and stirrability of these liquid dispersions.

In this case, hen's shell eggs were broken and pure water was added to the egg yolk liquid (45% solids) taken therefrom; the pure water and egg yolk liquid were stirred for 1 minute at 2000 rpm using a homogenizer (Hiscotron, Niti-on Co., Ltd.) to be blend sufficiently; the temperature was raised to 45° C.; plant sterol (the same substance used in Example 1) was added gradually with stirring at 5000 rpm; when the addition was completed, stirring was performed at 10,000 rpm; and a liquid dispersion of plant sterol and egg yolk lipoprotein was obtained.

With respect to the dispersibility of the liquid dispersion, 0.5 g of the liquid dispersion of the complex of plant sterol with egg yolk lipoprotein was placed in a test tube (1.6 cm inside diameter, 17.5 cm long); the dispersion was diluted with 10 mL of 0.9% saline solution and mixed by shaking with a test tube mixer (model TM-151, Iwaki Glass) for 10 sec, let stand for 1 hour, and then placed in a vacuum drier (model VOS-450D, Tokyo Rikakikai Co., Ltd.) and degassed at room temperature (20° C.) under a vacuum of 10 mmHg; if no floating material was seen, a score of "Good" was assigned, and if floating material was seen, a score of "No Good" was assigned. When the specific gravity of the plant sterol was determined by melting the plant sterol by heating, cooling it down, and immersing it in ethanol solutions with different specific gravities to see if it floated or sank, the specific gravity was found to be 0.98; therefore, it is believed that the floating material in the above dispersibility test was plant sterol.

Table 3 shows the results.

Example 3

Re-Dispersion of Complex Powder (1) Preparation of Complex 9982 g of pure water was added to 18 g of egg yolk liquid obtained by the breaking of hen's shell eggs (50% egg yolk solids, approximately 7.2 g of egg yolk lipoprotein in the egg yolk liquid); the liquid was stirred at 5000 rpm for 3 minutes until uniform using a homogenizer (T. K. Homomixer®, Tokushu Kika Kogyo Co., Ltd.); then the stirring speed was raised to 12,000 rpm and 1500 g of plant sterol (the same substance used in Example 1) (208 parts by mass of plant sterol to 1 part by mass of egg yolk lipoprotein) was gradually added; and after addition was complete stirring was continued for another 5 minutes. Next, the mixture was heated to 61° C. for 4 minutes while stirring with a marine propeller type stirrer for low-temperature sterilization to prepare the liquid dispersion of the complex of plant sterol with egg yolk lipoprotein.

A portion of the liquid dispersion obtained thereby was freeze-dried, and after it was pulverized with a mortar, it was

TABLE 3

| Ex. | Composition | | | Water content of liquid dispersion (%) | Plant sterol/egg yolk solids (weight ratio) | Plant sterol/egg yolk lipoprotein (weight ratio) | Water content/egg yolk solids (weight ratio) | Dispersibility |
|---|---|---|---|---|---|---|---|---|
| | Egg yolk liquid (g) | Pure water (g) | Plant sterol (g) | | | | | |
| 2-1 | 100 | 0 | 43.2 | 38.4 | 1.0 | 1.2 | 1.2 | Good |
| 2-2 | 67 | 33 | 55.7 | 44.9 | 1.8 | 2.3 | 2.3 | Good |
| 2-3 | 50 | 50 | 58.5 | 48.9 | 2.6 | 3.3 | 3.4 | Good |
| 2-4 | 33 | 67 | 64.8 | 51.7 | 4.4 | 5.5 | 5.7 | Good |
| 2-5 | 10 | 90 | 49.4 | 63.9 | 11.0 | 13.7 | 21.2 | Good |
| 2-6 | 5 | 95 | 35.5 | 72.1 | 15.8 | 20 | 43.4 | Good |
| 2-7 | 2 | 98 | 20.0 | 82.6 | 22.2 | 27.8 | 110.1 | Good |
| 2-8 | 0.45 | 99.55 | 20.0 | 83.2 | 98.8 | 123.5 | 492.8 | Good |
| 2-9 | | | 25.0 | 79.8 | 123.5 | 154.3 | | Good |
| 2-10 | | | 30.0 | 76.8 | 148.1 | 185.2 | | Good |
| 2-11 | 0.18 | 99.82 | 5.0 | 95.2 | 61.7 | 77.2 | 1233.6 | Good |
| 2-12 | | | 10.0 | 90.8 | 123.5 | 154.3 | | Good |
| 2-13 | | | 15.0 | 86.9 | 185.2 | 231.5 | | Good |
| 2-14 | | | 20.0 | 83.3 | 246.9 | 308.6 | | No good |
| 2-15 | | | 25.0 | 79.9 | 308.6 | 385.8 | | No good |

From Table 3 it is clear that to provide the complex with good dispersibility, it is sufficient to use 185 g or less of plant sterol to 1 g of egg yolk solid (approximately 232 g or less of plant sterol to 1 g of egg yolk lipoprotein) (Example 2-13); in other words, the slight amount of 0.54 or more parts by mass of egg yolk solids (0.43 or more parts by mass of egg yolk lipoprotein) is sufficient to disperse 100 parts by mass of plant sterol in water.

Moreover, in Examples 2-1 and 2-2 shown in Table 3, the viscosity became high when the plant sterol is added, and a stirring and a mixing time of 10 minutes or longer was required; in Examples 2-3 to 2-13, however, stirring and mixing could be performed easily in a short time (about 5 minutes). Therefore, it is clear that the preferred water content in the liquid dispersion is 48.9% or higher.

passed through a 30-mesh sieve to obtain a powder containing the complex of plant sterol with egg yolk lipoprotein (complex content ratio 99.88%).

Quantities of 0.202 g, 0.405 g and 1.52 g of the powder containing the complex of plant sterol with egg yolk lipoprotein obtained in the above manner were each placed in test tubes (16 mm inside diameter, 17.5 cm long) and 0.9% saline solution was added to make a weight of 10 g; each test tube was sonicated for 1 minute using an ultrasonic generator (model Sine Sonic 100; Kokusai Denki Electric Co., Ltd.); and after it was let stand for 1 hour at room temperature, observations were made on the dispersion state of the complex and the presence or absence of a floating layer.

For a control, 0.2 g, 0.4 g, and 1.5 g of plant sterol (the same substance used in Example 1) were dispersed directly in saline solution instead of the powder containing the complex, and observations were made on the dispersion state and the presence or absence of a floating layer.

The results are shown in Table 4.

TABLE 4

| Plant sterol concentration in liquid dispersion (%) | Control | | Example 3: Re-dispersion of complex powder liquid | |
|---|---|---|---|---|
| | Floating layer | Lower layer | Floating layer | Lower layer |
| 2 | Yes | transparent | No | Uniformly cloudy |
| 4 | Yes | transparent | No | Uniformly cloudy |
| 15 | Yes | transparent | No | Uniformly cloudy |

As shown in Table 4, in the control the plant sterol did not disperse, a floating layer was seen at each of the added amounts, and the lower layer was transparent. In contrast, when the complex powder prepared according to Example 3 was re-dispersed, the liquid dispersions were cloudy throughout at each of the added amounts, and few precipitate was seen.

Example 4

Mayonnaise-Like Emulsified Food Product

The following liquid dispersions of the complex of plant sterol with egg yolk lipoprotein were prepared in the composition shown in Table 5.

First, pure water was added to egg yolk liquid (made by QP Corporation, Egg Yolk with Salt (40.5% egg yolk solids, 10% added salt)) and the liquid was placed in a mixer (T. K. Homomixer®, Tokushu Kika Kogyo Co., Ltd.) and mixed for 3 minutes at 5000 rpm to blend the water and egg yolk. Next the mixer speed was set to 14,000 rpm and plant sterol (the same substance used in Example 1) was gradually added while stirring was continued, and the mixture was stirred for 20 minutes to obtain a liquid dispersion of the complex of plant sterol with egg yolk lipoprotein.

Using the liquid dispersion of complex obtained thereby, a mayonnaise-like emulsified food product was prepared in the following manner using the composition shown in Table 6. First, the liquid dispersion of the complex of plant sterol with egg yolk lipoprotein was placed in a kitchen mixer; pure water and egg white liquid were added and the resulting liquid was mixed for 1 minute; next, salt, modified starch, mustard powder, xanthan gum, refined sugar, and monosodium glutamate were added, and stirring was continued for 1 minute; canola oil was gradually added, and stirred for 3 minutes; vinegar was gradually added and stirred for 1 minute; and degassing was performed by stirring for 1 minute under a vacuum of 0 to 10 mmHg to obtain the mayonnaise-like emulsified food product.

As a Control Example, a mayonnaise-like emulsified food product was prepared after plant sterol was dispersed in canola oil in accordance with the composition shown in Table 7. More specifically, plant sterol was added to canola oil and mixed for 10 minutes in a mixer (T. K. Homomixer®, Tokushu Kika Kogyo Co., Ltd.) at 10,000 rpm to prepare an oil dispersion of plant sterol. Next, egg yolk liquid (made by QP Corporation, Egg Yolk with Salt (10% added salt)), egg white liquid, and pure water were placed in a kitchen mixer and mixed for 1 minute; salt, modified starch, mustard powder, xanthan gum, refined sugar, and monosodium glutamate were added and stirred for 1 minute; the oil dispersion of plant sterol was gradually added and stirred for 3 minutes; vinegar was gradually added and stirred for 1 minute; and degassing was performed by stirring for 1 minute under a vacuum of 0 to 10 mmHg to prepare the mayonnaise-like emulsified food product.

The mayonnaise-like food product from Example 4 and the Control Example were subjected to a taste test to investigate the texture. In addition, a separation test was performed by placing 120 g of each mayonnaise-like emulsified food product in a 200 g capacity flexible polyethylene bottle, squeezing and releasing the uncapped flexible bottle repeatedly 10 times, and examining the emulsification appearance of the mayonnaise-like emulsified food product immediately following the separation test and after one day of storage following the separation test.

The results are shown in Table 8.

TABLE 5

Composition of Liquid Dispersion of Plant Sterol and Egg Yolk Lipoprotein

| Composition | parts by mass |
|---|---|
| Egg yolk liquid (10% salt added) | 11.04 |
| (Egg yolk lipoprotein) | (3.6) |
| Plant sterol | 6.33 |
| Pure water | 12.63 |
| (Total) | (30.00) |

TABLE 6

Composition of Mayonnaise-like Emulsified Food Product in Example 4

| Composition | (%) |
|---|---|
| Canola oil | 28 |
| Liquid dispersion of plant sterol and egg yolk lipoprotein | 30 |
| Egg white liquid | 3 |
| Vinegar | 7 |
| Salt | 1.3 |
| Modified starch | 3.5 |
| Mustard powder | 0.2 |
| Xanthan gum | 0.5 |
| Refined sugar | 0.5 |
| Monosodium glutamate | 0.5 |
| Pure water | 25.5 |
| (Total) | (100.0) |

TABLE 7

Composition of Mayonnaise-like Emulsified Food Product of Control Example in Example 4

| Composition | (%) |
|---|---|
| Canola oil | 28.0 |
| Egg yolk liquid (10% salt added) | 11.04 |
| Plant sterol | 6.33 |
| Egg white liquid | 3.0 |
| Vinegar | 7.0 |
| Salt | 1.3 |
| Modified starch | 3.5 |
| Mustard powder | 0.2 |
| Xanthan gum | 0.5 |

TABLE 7-continued

Composition of Mayonnaise-like Emulsified Food Product of Control Example in Example 4

| Composition | (%) |
|---|---|
| Refined sugar | 0.5 |
| Monosodium glutamate | 0.5 |
| Pure water | 38.13 |
| (Total) | (100.00) |

TABLE 8

|  | Texture | Immediately following separation test | After 1 day of storage following separation test |
|---|---|---|---|
| Example 4 | Smooth | No separation | No separation |
| Control Example | Rough | Cracks in surface with oil seeping out | Amount of oil seepage greater than immediately after separation test |

The results in Table 8 show that in the control sample, wherein plant sterol was dispersed in canola oil in advance, a stable mayonnaise-like emulsified food product was not obtained because the texture was rough and immediately after the separation test cracks appeared with oil seepage, etc.

In contrast, by means of the mixing of plant sterol with egg yolk in advance to form the complex, the mayonnaise-like emulsified food product of Example 4 showed a smooth texture and a stable emulsification state without cracks and oil seepage.

Example 5

Difference in Emulsion Stabilizing Power Between the Liquid Dispersions of the Complex of Plant Sterol with Egg Yolk Lipoprotein and of the Complex of the Liquid Dispersion of plant Sterol with Phospholipid in a Mayonnaise-Like Emulsified Food Product A mayonnaise-like emulsified food product using the liquid dispersion of the complex of plant sterol with egg yolk lipoprotein and a mayonnaise-like emulsified food product using a liquid dispersion of plant sterol and phospholipid were prepared as shown below, and they were compared in respect of an emulsification stability.

(1) Preparation of Mayonnaise-Like Emulsified Food Product

First a liquid dispersion of the complex of plant sterol with egg yolk lipoprotein was prepared in accordance with the method of Example 4 using the composition shown in Table 9. In this instance, egg yolk liquid (45% solids) obtained by the breaking hen's shell eggs was used.

TABLE 9

Composition of Liquid Dispersion of Complex of Plant Sterol with Egg Yolk Lipoprotein

| Composition | parts by mass |
|---|---|
| Egg yolk liquid (Egg yolk lipoprotein) | 2.2 (0.8) |
| Plant sterol | 6.0 |
| Pure water | 15.8 |
| (Total) | (24.0) |

On the other hand, a liquid dispersion of plant sterol and phospholipid was prepared as a Control Example in the following manner using the composition shown in Table 10. More specifically, egg yolk liquid obtained by the breaking of hen's shell eggs (45% egg yolk solids) was spray dried, and after the dried egg yolk was obtained, the lipids were extracted with ethanol, the ethanol was removed, and the neutral lipids were removed with acetone to obtain phospholipid (powder).

Pure water was added to the phospholipid and blended by mixing for 2 minutes at 5000 rpm with a mixer (Hiscotron, Nition Co., Ltd.); the mixture was heated to 45° C., and plant sterol (the same substance used in Example 1) was gradually added with stirring at 5000 rpm; and when the addition was completed, the mixture was stirred additionally for 5 minutes at 10,000 rpm to prepare the liquid dispersion of plant sterol and phospholipid.

TABLE 10

Composition of Complex of Plant Sterol with Phospholipid

| Composition | parts by mass |
|---|---|
| Phospholipid | 1.2 |
| Plant sterol | 6.0 |
| Pure water | 16.8 |
| (Total) | (24.0) |

Using the liquid dispersions obtained in the above manner, mayonnaise-like emulsified food products were prepared in accordance with the compositions of Table 11 and Table 12. The method of preparation was the same as in Example 4 except the egg yolk liquid (45% solids) was also placed in the kitchen mixer with the liquid dispersion, egg white liquid, and pure water, and all were mixed together.

TABLE 11

Composition of Mayonnaise-like Emulsified Food Product of Example 5

| Composition | (%) |
|---|---|
| Canola oil | 28.0 |
| Liquid dispersion of complex of plant sterol with egg yoke lipoprotein | 24.0 |
| Egg yolk liquid | 8.0 |
| Egg white liquid | 3.0 |
| Vinegar | 7.0 |
| Salt | 1.3 |
| Modified starch | 3.5 |
| Mustard powder | 0.2 |
| Xanthan gum | 0.5 |
| Refined sugar | 0.5 |
| Monosodium glutamate | 0.5 |
| Pure water | 23.5 |
| (Total) | (100.0) |

TABLE 12

Composition of Mayonnaise-like Emulsified Food Product of Control Example in Example 5

| Composition | (%) |
|---|---|
| Canola oil | 28.0 |
| Liquid dispersion of plant sterol and phospholipid | 24.0 |
| Egg yolk liquid | 8.0 |
| Egg white liquid | 3.0 |
| Vinegar | 7.0 |
| Salt | 1.3 |
| Modified starch | 3.5 |
| Mustard powder | 0.2 |
| Xanthan gum | 0.5 |
| Refined sugar | 0.5 |
| Monosodium glutamate | 0.5 |
| Pure water | 23.5 |
| (Total) | (100.0) |

(2) Comparison of Emulsification Stability

The emulsification stability of the mayonnaise-like emulsified food product using the liquid dispersion of the complex of plant sterol with egg yolk lipoprotein and that of the mayonnaise-like food product using the liquid dispersion of plant sterol and phospholipid were investigated in the following manner.

First, 200 g of each mayonnaise-like emulsified food product was placed in a 200 g capacity, flexible polyethylene bottle. A separation test (emulsification stability test) was performed on each product after it was capped and stored for 1 day at 30° C. and after it was capped and stored for 3 months at 30° C.

For the separation test, the bottle was uncapped, 80 g of the contents were removed, the center of the uncapped flexible bottle was squeezed with the hand and released repeatedly 10 times, and the emulsification state was observed immediately after those repetitions. The results are shown in Table 13.

TABLE 13

|  | After 1 day (30° C.) | After 3 months |
|---|---|---|
| Example 5 | No change Emulsification was stable | No change Emulsification was stable |
| Control Example | Slight oil seepage | Cracking and oil separation occurred |

From the results shown in Table 13 it is clear that in the Control Example mayonnaise-like emulsified food product using the liquid dispersion of plant sterol and phospholipid, oil seepage occurred after only 1 day, and after 3 months cracks appeared and oil seepage had progressed even though a sufficient amount of egg yolk liquid for the general preparation of mayonnaise was used (the content of egg yolk liquid in mayonnaise-like emulsified food products on the market is approximately 3% to 15%). It is inferred that the cause of this oil separation is that the oil adhered to the hydrophobic surface of the particles of plant sterol because no complex between the plant sterol and lipoprotein was formed, and the breakdown of emulsification proceeded from that oil-adhered point.

In contrast, in the mayonnaise-like emulsified food product using the liquid dispersion of the complex of plant sterol with egg yolk lipoprotein from Example 5, no separation occurred even after 3 months, and the emulsification stability was excellent. It is assumed that this is because the plant sterol and the egg yolk lipoprotein formed a complex.

Example 6

Mayonnaise-Like Emulsified Food Product Containing Lyso-Phospholipid

The following liquid dispersion of the complex of plant sterol with egg yolk lipoprotein was prepared using the composition shown in Table 14. First egg white liquid and pure water were added to egg yolk liquid (made by QP Corporation, "Egg Yolk with Salt" (40.5% egg yolk solids, 10% added salt)) in a mixer and mixed to blend the ingredients. Next plant sterol (the same substance used in Example 1) was added and stirred; then enzyme-treated egg yolk oil (made by QP Corporation, "Egg Yolk Lecithin LPL-20" (containing approximately 20% lyso-phospholipid)) mixed with canola oil in advance was added, stirred and mixed until uniform to obtain a liquid dispersion of the complex of plant sterol with egg yolk lipoprotein.

Using the liquid dispersion of the complex obtained thereby, a mayonnaise-like emulsified food product was prepared in the following manner using the composition shown Table 15. First, vinegar concentrate and pure water were placed in a mixer and mixed; then salt, starch syrup, mustard powder, xanthan gum, refined sugar, and monosodium glutamate were added, stirred and mixed until uniform to obtain a seasoning liquid.

The seasoning liquid obtained thereby was added to the aforementioned liquid dispersion of complex and stirred and mixed in a mixer; next, stirring and mixing were performed while slowly adding canola oil, and after a coarse emulsion was formed, a finishing emulsification process was performed using a homogenizer to prepare the mayonnaise-like emulsified food product (Example 6-1).

TABLE 14

Composition of Liquid Dispersion of Plant Sterol and Egg Yolk Lipoprotein in Example 6-1

| Composition | parts by mass |
|---|---|
| Egg yolk liquid (10% salt added) | 6.0 |
| (Egg yolk lipoprotein) | (1.9) |
| Plant sterol | 6.0 |
| Enzyme treated egg yolk oil | 2.0 |
| (lyso-phospholipid) | (0.4) |
| Canola oil | 3.0 |
| Egg white liquid | 4.5 |
| Pure water | 7.5 |
| (Total) | (29.0) |

TABLE 15

Composition of Mayonnaise-like Emulsified Food Product in Example 6

| Composition | (%) |
|---|---|
| Canola oil | 21.0 |
| Liquid dispersion of complex of plant sterol with egg yolk lipoprotein | 29.0 |
| Vinegar concentrate | 7.5 |
| Salt | 1.5 |
| Millet jelly | 1.5 |
| Mustard powder | 0.2 |

TABLE 15-continued

Composition of Mayonnaise-like Emulsified
Food Product in Example 6

| Composition | (%) |
|---|---|
| Xanthan gum | 0.8 |
| Refined sugar | 1.0 |
| Monosodium glutamate | 0.5 |
| Pure water | 37.0 |
| (Total) | (100.0) |

Liquid dispersions of the complex of plant sterol with egg yolk lipoprotein were prepared as Examples 6-2 to 6-5 using the compositions shown in Table 16. The preparation method was the same as the method for preparing the liquid dispersion of the complex in Example 6-1, but in Examples 6-4 and 6-5, the modified starch shown in Table 16 was used in place of the enzyme-treated egg yolk oil and canola oil.

In addition, the preparation of the mayonnaise-like emulsified food product was the same as the production process of Example 6-1 except that the liquid dispersions of complex shown in each of the compositions of Table 16 were used in place of the liquid dispersion of complex shown in Table 14.

TABLE 16

|  | (parts by mass) | | | |
|---|---|---|---|---|
|  | Example 6-2 | Example 6-3 | Example 6-4 | Example 6-5 |
| Egg yolk liquid (10% salt added) | 6.0 | 6.0 | 6.0 | 6.0 |
| (Egg yolk lipoprotein) | (1.9) | (1.9) | (1.9) | (1.9) |
| Plant sterol | 6.0 | 6.0 | 6.0 | 6.0 |
| Enzyme treated egg yolk oil (lyso-phospholipid) | 1.5 (0.3) | 1.0 (0.2) | — (—) | — (—) |
| Canola oil | 3.5 | 4.0 | — | — |
| Modified starch (*A) | — | — | 3.0 | — |
| Modified starch (*B) | — | — | — | 3.0 |
| Egg white liquid | 4.5 | 4.5 | 4.5 | 4.5 |
| Pure water | 7.5 | 7.5 | 9.5 | 9.5 |
| (Total) | (29.0) | (29.0) | (29.0) | (29.0) |

(*A) Brand name "Erumasuta #30A" Matsutani Chemical Industry Co., Ltd.
(*B) Brand name "N-Creamer 45" National Starch and Chemical Co.

A separation test was performed by placing 120 g of each mayonnaise-like emulsified food product from Examples 6-1 to 6-5 in a separate 200 g capacity flexible polyethylene bottle, squeezing and releasing the uncapped flexible bottle repeatedly 10 times or 15 times, and examining the emulsification state of the mayonnaise-like emulsified food product immediately after the separation test. The results are shown in Table 17.

TABLE 17

| Mayonnaise-like emulsified food product | 10 Squeezes | 15 Squeezes |
|---|---|---|
| Example 6-1 | No change Emulsification was stable | No change Emulsification was stable |
| Example 6-2 | Same as above | Same as above |
| Example 6-3 | Same as above | Slight oil seepage |
| Example 6-4 | Same as above | Same as above |
| Example 6-5 | Same as above | Same as above |

From the results of Table 17 it is clear that all of the mayonnaise-like emulsified food products of Examples 6-1 to 6-5 show no oil seepage after 10 squeezes and have a practical level of emulsification stability.

In addition, it is clear that the mayonnaise-like emulsified food products of Examples 6-1 and 6-2, which contain 0.3% or more of lyso-phospholipid have especially good emulsification stability and show no oil seepage even after 15 squeezes.

Example 7

Separation Tests of Mayonnaise-Like Emulsified Food Products Produced Using Untreated Egg Yolk, PLA Modified Egg Yolk, Decholesterolized Egg Yolk, and PLA Modified Decholesterolized Egg Yolk Using the same production process as in Example 6-1 and the liquid dispersions of complex shown in Table 18, the mayonnaise-like emulsified food products of Examples 7-1 to 7-8 were prepared using the compositions shown in Table 19.

For the PLA modified egg yolk liquid used in the preparation of the liquid dispersion of complex in this example, an egg yolk liquid with salt, prepared by adding 10 wt % salt to egg yolk liquid (45% solids) obtained by the industrial breaking of hen's shell eggs, was enzymatically treated with phospholipase $A_2$ to obtain a PLA modified egg yolk liquid with salt having a lyso-conversion ratio of 50%.

For the decholesterolized egg yolk, first an egg yolk liquid (45% solids) obtained by the industrial breaking of hen's shell egg was desugared with yeast and dried; the cholesterol was removed with supercritical carbon dioxide to obtain a decholesterolized dried egg yolk with a cholesterol content of 0.25% and 95% solids (measured by drying at 105° C.); and then a 3-fold amount by mass of pure water (8.1%) and salt (1.2%) were added to the dried egg yolk (2.7%), and the egg yolk was rehydrated in water by high-speed mixing.

For the PLA modified decholesterolized egg yolk, first PLA modified egg yolk liquid with a lyso-conversion ratio of 55% was prepared by the enzymatic treatment of egg yolk liquid (45% solids) obtained by the industrial breaking of hen's shell eggs with phospholipase $A_2$; the egg yolk liquid was dried and the cholesterol was removed with supercritical carbon dioxide to obtain a PLA modified decholesterolized dried egg yolk with a cholesterol content of 0.15% and 96% solids (measured by drying at 105° C.); and then a 3-fold amount by mass of pure water (8.1%) and salt (1.2%) were added to the dried egg yolk (2.7%), and the egg yolk was rehydrated in water by high-speed mixing.

The same separation test as described in Example 6 was performed on each of the mayonnaise-like emulsified food products obtained thereby, and the emulsification status was observed after repeated squeeze/release cycles of 10, 15, 20, and 25 times.

The results are shown in Table 20.

TABLE 18

Composition of Liquid Dispersion of Complex

|  | Example | | | | | | | | (%) |
|---|---|---|---|---|---|---|---|---|---|
|  | 7-1 | 7-2 | 7-3 | 7-4 | 7-5 | 7-6 | 7-7 | 7-8 | |
| Egg yolk liquid (10% salt) | 12.0 | 12.0 | | | | | | | |
| PLA modified egg yolk liquid (10% salt) | | | 12.0 | 12.0 | | | | | |

TABLE 18-continued

Composition of Liquid Dispersion of Complex (%)

| | Example | | | | | | | |
|---|---|---|---|---|---|---|---|---|
| | 7-1 | 7-2 | 7-3 | 7-4 | 7-5 | 7-6 | 7-7 | 7-8 |
| De-cholesterolized dried egg yolk | | | | | 2.7 | 2.7 | | |
| PLA modified de-cholesterolized dried egg yolk | | | | | | | 2.7 | 2.7 |
| Salt | | | | | 1.2 | 1.2 | 1.2 | 1.2 |
| Pure water to rehydrated dried egg yolk | | | | | 8.1 | 8.1 | 8.1 | 8.1 |
| Plant sterol | 6.0 | 6.0 | 6.0 | 6.0 | 6.0 | 6.0 | 6.0 | 6.0 |
| Enzyme-treated egg yolk oil (lyso-phospholipid) | | 1.5 (0.3) | | 1.5 (0.3) | | 1.5 (0.3) | | 1.5 (0.3) |
| Egg white liquid | 4.5 | 4.5 | 4.5 | 4.5 | 4.5 | 4.5 | 4.5 | 4.5 |
| Pure water | 7.5 | 6.0 | 7.5 | 6.0 | 7.5 | 6.0 | 7.5 | 6.0 |
| (Total) | 30.0 | 30.0 | 30.0 | 30.0 | 30.0 | 30.0 | 30.0 | 30.0 |

TABLE 19

Composition of Mayonnaise-like Emulsified Food Products in Examples 7-1 to 7-8

| Compostion | (%) |
|---|---|
| Canola oil | 20.0 |
| Liquid dispersion of complex | 30.0 |
| Vinegar concentrate | 7.5 |
| Salt | 1.5 |
| Millet jelly | 1.5 |
| Mustard powder | 0.2 |
| Xanthan gum | 0.8 |
| Refined sugar | 1.0 |
| Monosodium glutamate | 0.5 |
| Pure water | 37.0 |
| (Total) | 100.0 |

TABLE 20

Separation Test Evaluation

| Number of Squeeze | Example | | | | | | | |
|---|---|---|---|---|---|---|---|---|
| | 7-1 | 7-2 | 7-3 | 7-4 | 7-5 | 7-6 | 7-7 | 7-8 |
| 10 times | G | G | G | G | G | G | G | G |
| 15 times | NG | G | G | G | NG | G | G | G |
| 20 times | NG | NG | NG | G | NG | NG | G | G |
| 25 times | NG | NG | NG | NG | NG | NG | G | G |

(Evaluation) "G": Emulsification stable, "NG": Oil seepage

From the results in Table 20 it is clear that the emulsification stability is the highest when PLA modified decholesterolized egg yolk is used (Examples 7-7 and 7-8), and the emulsification stability is next highest when PLA modified egg yolk is used (Examples 7-3 and 7-4). When decholesterolized egg yolk was used (Examples 7-5 and 7-6), the result is about the same as when untreated egg yolk is used (Examples 7-1 and 7-2). However, in light of the fact that the purpose for using the oil-in-water emulsified food product of the present invention is to reduce the level of cholesterol in the blood, the fact that decholesterolized egg yolk can be used as an ingredient in place of untreated egg yolk suits the object of the present invention, and is therefore preferred.

The invention claimed is:

1. A method for producing an oil-in-water emulsified food product containing a complex comprising plant sterol and egg yolk lipoprotein, the method comprising:
   preparing a liquid dispersion of the complex by stirring and mixing at least egg yolk lipoprotein and plant sterol, wherein the composition ratio of plant sterol to egg yolk lipoprotein in the complex is 5 to 232 parts by mass of plant sterol per 1 part by mass of egg yolk lipoprotein;
   adding oil-phase material to the liquid dispersion of the complex; and
   performing emulsification.

2. The method for producing the oil-in-water emulsified food product according to claim 1, wherein the preparing of the liquid dispersion of the complex further comprises adding at least one of a water-based medium or lyso-phospholipid.

3. The method for producing the oil-in-water emulsified food product according to claim 2 comprising adding lyso-phospholipid or a water phase ingredient to the liquid dispersion, followed by stirring and mixing.

4. The method for producing the oil-in-water emulsified food product according to claim 1, further comprising adding at least one of a lyso-phospholipid or a water phase ingredient to the liquid dispersion.

5. The method for producing the oil-in-water emulsified food product according to claim 1, wherein the liquid dispersion of the complex is prepared using 232 or less parts by mass of plant sterol with respect to 1 part by mass of egg yolk lipoprotein.

6. The method for producing the oil-in-water emulsified food product according to claim 1, wherein an egg yolk liquid is used as the egg yolk lipoprotein.

7. The method for producing the oil-in-water emulsified food product according to claim 6, wherein 185 or less parts by mass of plant sterol is used per 1 part by mass of egg yolk solid.

8. The method for producing the oil-in-water emulsified food product according to claim 1, wherein a dilute egg yolk liquid is used as the egg yolk lipoprotein.

9. The method for producing the oil-in-water emulsified food product according to claim 8, wherein the stirring and mixing of the dilute egg yolk liquid and the plant sterol is conducted at a temperature of from about 45° C. to about 55° C.

10. The method for producing the oil-in-water emulsified food product according to claim 1, wherein the mean particle size of the plant sterol is 50 μm or less.

11. The method for producing the oil-in-water emulsified food product according to claim 1, wherein in preparing the liquid dispersion, the plant sterol is in the form of flakes or powder.

12. The method for producing the oil-in-water emulsified food product according to claim 1, wherein the mean particle size of the plant sterol is 10 μm or less.

13. The method for producing an oil-in-water emulsified food product according to claim 1, wherein the egg yolk lipoprotein is a lipoprotein contained in PLA (phospholipase A) modified egg yolk, decholesterolized egg yolk, or PLA modified decholesterolized egg yolk.

14. The method for producing an oil-in-water emulsified food product according to claim 1, wherein the food product contains lyso-phospholipid.

15. The method for producing an oil-in-water emulsified food product according to claim 1, wherein the food product contains lyso-phospholipid in an amount of 0.3 weight percent or more.

16. The method for producing an oil-in-water emulsified food product according to claim 1, wherein the plant sterol comprises β-sitosterol, stigmasterol, campesterol, brassicasterol, plant stanol, or mixtures thereof.

17. The method for producing an oil-in-water emulsified food product according to claim 1, wherein the complex has dispersability such that a floating layer is not seen in a liquid dispersion when the complex is dispersed in a 0.9% sodium chloride solution so that the concentration of plant sterol is 15% by mass, exposed to ultrasound for 1 minute and left to stand at room temperature for 1 hour.

* * * * *